(12) United States Patent
Cho et al.

(10) Patent No.: US 9,959,032 B2
(45) Date of Patent: May 1, 2018

(54) INFORMATION PROCESSING APPARATUS AND METHOD FOR DISPLAY CONTROL

(75) Inventors: Yunha Cho, Kanagawa (JP); Satoshi Asai, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 14/237,676

(22) PCT Filed: Aug. 7, 2012

(86) PCT No.: PCT/JP2012/005016
§ 371 (c)(1),
(2), (4) Date: Feb. 7, 2014

(87) PCT Pub. No.: WO2013/031099
PCT Pub. Date: Mar. 7, 2013

(65) Prior Publication Data
US 2014/0247233 A1    Sep. 4, 2014

(30) Foreign Application Priority Data

Sep. 1, 2011  (JP) .................................. 2011-191138

(51) Int. Cl.
*G06F 3/0488*  (2013.01)
*G06F 3/041*  (2006.01)

(52) U.S. Cl.
CPC ............ *G06F 3/0488* (2013.01); *G06F 3/041* (2013.01)

(58) Field of Classification Search
CPC ........ G06F 3/0488; G06F 3/041; G06F 21/36; H04M 1/675
See application file for complete search history.

(56) References Cited

U.S. PATENT DOCUMENTS

| | | | |
|---|---|---|---|
| 2002/0171690 A1* | 11/2002 | Fox et al. | 345/862 |
| 2008/0024459 A1* | 1/2008 | Poupyrev et al. | 345/173 |
| 2009/0006991 A1* | 1/2009 | Lindberg et al. | 715/763 |

(Continued)

FOREIGN PATENT DOCUMENTS

| | | |
|---|---|---|
| JP | 2002-351592 A | 12/2002 |
| JP | 2005-322088 A | 11/2005 |

(Continued)

OTHER PUBLICATIONS

International Search Report dated Nov. 20, 2012 in PCT/JP2012/005016.

(Continued)

*Primary Examiner* — Temesghen Ghebretinsae
*Assistant Examiner* — Yaron Cohen
(74) *Attorney, Agent, or Firm* — Oblon, McClelland, Maier & Neustadt, L.L.P.

(57) ABSTRACT

An information processing apparatus, method and computer program product are described. At least the apparatus includes comprising a display control device that controls a display of a lock release screen that has displayed thereon a manipulation object and a target object. A manipulation detection device detects a lock release manipulation as a detected moving of the manipulation object toward the target object. The display control device changes an appearance of the target object in response to the manipulation detection device detecting the moving of the manipulation object toward the target object.

19 Claims, 8 Drawing Sheets

(56) References Cited

U.S. PATENT DOCUMENTS

2010/0001967 A1* 1/2010 Yoo .............................. 345/173
2010/0085317 A1* 4/2010 Park ..................... G06F 1/1626
            345/173

FOREIGN PATENT DOCUMENTS

JP       2011-48665 A    3/2011
JP       2011-48848 A    3/2011

OTHER PUBLICATIONS

Tim Stevens, "Nokia bubbles lets you intelligently unlock your N8 in a pop", http://www.engadget.com/2011/02/04/nokia-bubbles-lets-you-intelligently-unlock-your-n8-in-a-pop/, Feb. 4, 2011, 7 Pages.
"Nokia Bubbles", http://betalabs.nokia.com/trials/nokia-bubbles/more_info>, May 26, 2011, 3 Pages.
Office Action dated Aug. 18, 2015 in Japanese Patent Application No. 2011-191138.
Extended European Search Report dated Jun. 30, 2015 in Patent Application No. 12828868.5.
Office Action dated Jun. 30, 2015 in Japanese Patent Application No. 2011-191138.
ZachhFrosty, "Cool Android Lockscreen Alternative: GOTO Lockscreen" Retrieved from the Internet [https://www.youtube.com/watch?v=4GTUmTG8U0U], XP054975938, Jan. 4, 2011, 1 Page.
Tim Stevens, "Nokia Bubbles lets you intelligently unlock your N8 in a pop" Retrieved from the Internet [http://www.engadget.com/2011/02/04/nokia-bubbles-lets-you-intelligently-unlock-your-n8-in-a-pop], Feb. 4, 2011, 4 Pages.
Combined Office Action and Search Report dated May 25, 2016 in Chinese Patent Application No. 201280040888.0 (with English translation).
Combined Chinese Office Action and Search Report dated Dec. 30, 2016 in Patent Application No. 201280040888.0 (with English translation).
European Office Action dated May 10, 2017 in Patent Application No. 12 828 868.5.
Kellex: "GOTO Lockscreen Has the Potential to be the Best Lockscreen Replacement", Feb. 22, 2011, XP055369370, http://www.droid-life.com/2011/02/22/goto-lockscreen-has-the-potential-to-be-the-best-lockscreen-replacement/, Retrieved from the Internet: URL:https://web.archive.org/web/20110511080711/http://www.droid-life.com/2011/02/22/goto-lockscreen-has-the-potential-to-be-the-best-lockscreen-replacement/ [retrieved on May 4, 2017], 4 pages.
Björn Kafer: "Htc Desire Lockscreen app", May 14, 2011, XP055369395, youtube, Retrieved from the Internet: URL:https://www.youtube.com/watch?v=YbevgzRKOYo [retrieved on May 4, 2017], 5 pages.

* cited by examiner

INFORMATION PROCESSING APPARATUS AND METHOD FOR DISPLAY CONTROL

TECHNICAL FIELD

The present disclosure relates to an information processing apparatus, a display control method, and a computer program product.

BACKGROUND ART

In recent years, as typified by smartphones, information processing apparatuses which are equipped with a touch sensor and perform an input manipulation according to a position of a manipulation body on a display screen are in widespread use. In such information processing apparatuses, an unintended input manipulation is prevented by using a lock function for limiting the input manipulation (for example, Patent Document 1).

Various methods are proposed as a lock release manipulation for releasing each information processing apparatus from a lock state. For example, a user moves a manipulation object displayed on a display screen to a target position along a predetermined path, thereby making it possible to release the lock state.

CITATION LIST

Patent Literature

PTL 1: Patent Document 1: Japanese Patent Application Laid-Open No. 2011-48665

SUMMARY

Technical Problem

In the above-described method, however, the position of the manipulation object is merely changed on the display screen. This makes it difficult for a user to recognize the progress of the lock release manipulation and the lock release timing.

In view of the above, the present disclosure proposes a novel and improved information processing apparatus, display control method, and program capable of improving the operability for a user in a lock release manipulation.

Solution to Problem

According to the present disclosure, there is provided an information processing apparatus including: a display control unit that controls a display of a lock release screen that has displayed thereon a manipulation object and a target object; and a manipulation detection device that detects a lock release manipulation as a detected moving of the manipulation object toward the target object. The display control device changes an appearance of the target object in response to the manipulation detection device detecting the moving of the manipulation object toward the target object.

Further, according to the present disclosure, there is provided a display control method including the steps of: controlling display of a lock release screen having a manipulation object and a target object displayed thereon; detecting a lock release manipulation as a detected movement of the manipulation object toward the target object on the lock release screen; and changing an appearance of the target object in response to the detecting of the lock release manipulation of the manipulation object.

Furthermore, according to the present disclosure, there is provided a non-transitory computer program product having stored thereon computer readable instructions that when executed by a processor perform a display control method that includes controlling display of a lock release screen having a manipulation object and a target object displayed thereon; detecting a lock release manipulation as a detected movement of the manipulation object toward the target object on the lock release screen; and changing an appearance of the target object in response to the detecting of the lock release manipulation of the manipulation object.

Advantageous Effects of Invention

As described above, according to the present disclosure, it is possible to improve the operability for a user in a lock release manipulation.

DESCRIPTION OF EMBODIMENTS

Embodiments of the present disclosure will be described in detail below with reference to the accompanying drawings. Note that in the description and the drawings, constituent elements having substantially the same function are denoted by the same reference numeral and a redundant explanation is omitted.

Further, in the description and the drawings, a plurality of constituent elements including substantially the same functional component may be distinguished by adding different alphabets to the end of the same reference numeral. In this case, however, if there is no need to distinguish the plurality of constituent elements having substantially the same functional component, they are denoted by the same reference numeral.

The present disclosure will be described in the order of the following items.

1. Basic Configuration of Information Processing Apparatus
2. First Embodiment
2-1. Configuration of Information Processing Apparatus
2-2. Operation of Information Processing Apparatus
2-3. Modified Example
3. Hardware Configuration
4. Conclusion

1. Basic Configuration of Information Processing Apparatus

The technique according to the present disclosure can be carried out in an exemplary mode described in the item "2. First Embodiment". An information processing apparatus (20) according to an embodiment of the present disclosure includes:

A. a display control unit (244) that controls display of a lock release screen including a manipulation object and a target object; and B. a manipulation detection unit (242) that detects a lock release manipulation by a user moving the manipulation object to the target object on the lock release screen, wherein C. the display control unit changes an appearance of how the target object is displayed according to the movement of the manipulation object.

Hereinafter, the basic configuration of such an information processing apparatus will be first described with reference to FIG. 1.

Figure 1:
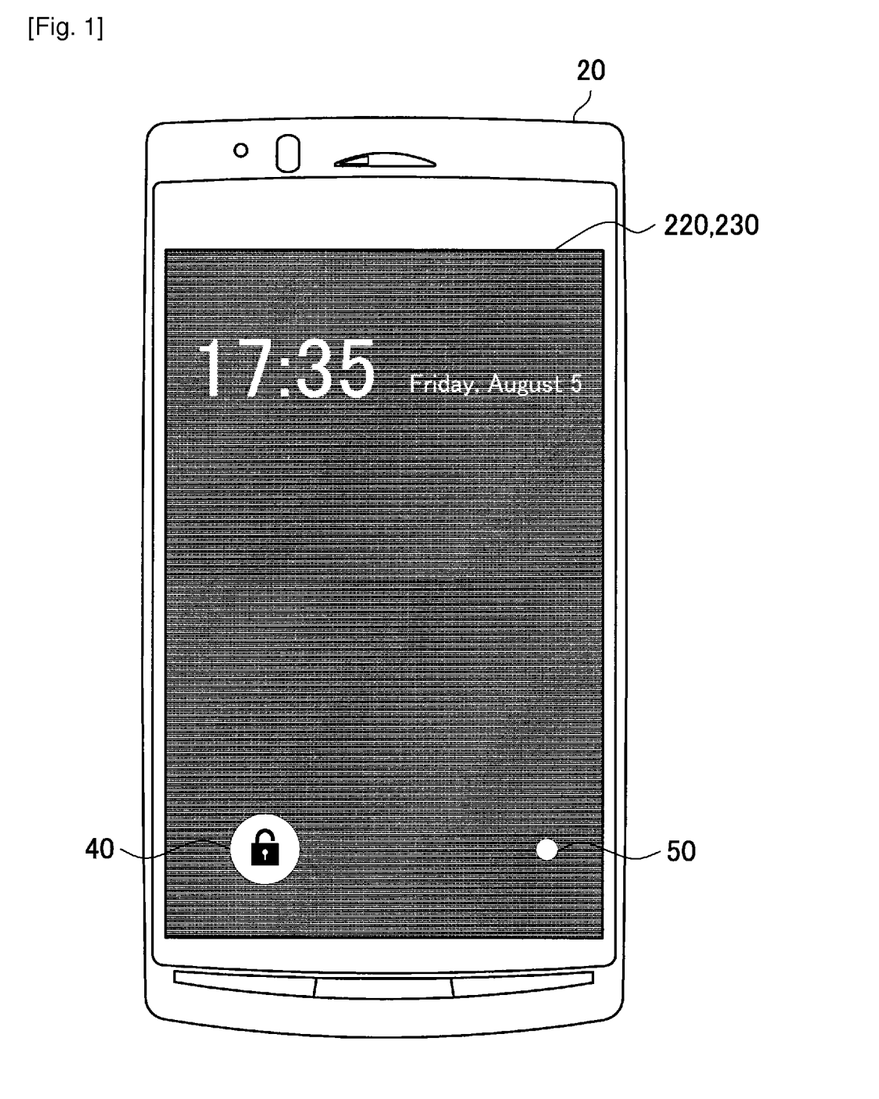
FIG. 1 is an explanatory diagram showing a configuration of an information processing apparatus according to an embodiment of the present disclosure.

FIG. 1 is an explanatory diagram showing the configuration of the information processing apparatus 20 according to an embodiment of the present disclosure. As shown in FIG. 1, the information processing apparatus 20 according to an embodiment of the present disclosure includes a display unit 220 formed on the surface of a casing, and a touch panel 230 laminated on the display unit 220. The information processing apparatus 20 may also include a manipulation unit, such as a button, separately from the touch panel 230. This configuration allows the information processing apparatus 20 to receive a user input according to a position of a manipulation body on a display screen displayed on the display unit 220. Further, the information processing apparatus 20 can control the contents of the display screen based on the user input by using a so-called GUI (Graphical User Interface).

Furthermore, the information processing apparatus 20 has a lock function for limiting the user input. In the lock state, all user manipulations other than a predetermined manipulation are invalidated, for example. Examples of the predetermined manipulation include a lock release manipulation and an urgent report manipulation. Transition to the lock state is carried out when a non-manipulation state is continued for a predetermined period of time, or when a user conducts a predetermined lock start manipulation, for example. This configuration prevents the user from carrying out an unintentional input.

Here, the lock release manipulation will be described. The information processing apparatus 20 in the lock state displays the lock release screen as shown in FIG. 1 on the display unit 220. As shown in FIG. 1, the lock release screen includes a manipulation object 40 that moves in response to a user manipulation, and a target object 50 representing a target position of the manipulation object 40. On this lock release screen, the user manipulates the touch panel 230 to move the manipulation object 40 toward the target object 50, thereby making it possible to release the lock state.

Note that FIG. 1 shows a tablet type mobile terminal as an example of the information processing apparatus 20, but the information processing apparatus 20 is not limited to such an example. Examples of the information processing apparatus 20 may include various devices having a lock function, such as a cellular phone, a portable music player, a portable image processor, a portable game console, a laptop PC (Personal Computer), and a tablet PC.

2. First Embodiment

The basic configuration of the information processing apparatus 20 according to the present disclosure has been described above. Subsequently, the configuration and operation of the information processing apparatus 20 according to the first embodiment will be described in detail.

2-1. Configuration of Information Processing Apparatus

Figure 2:
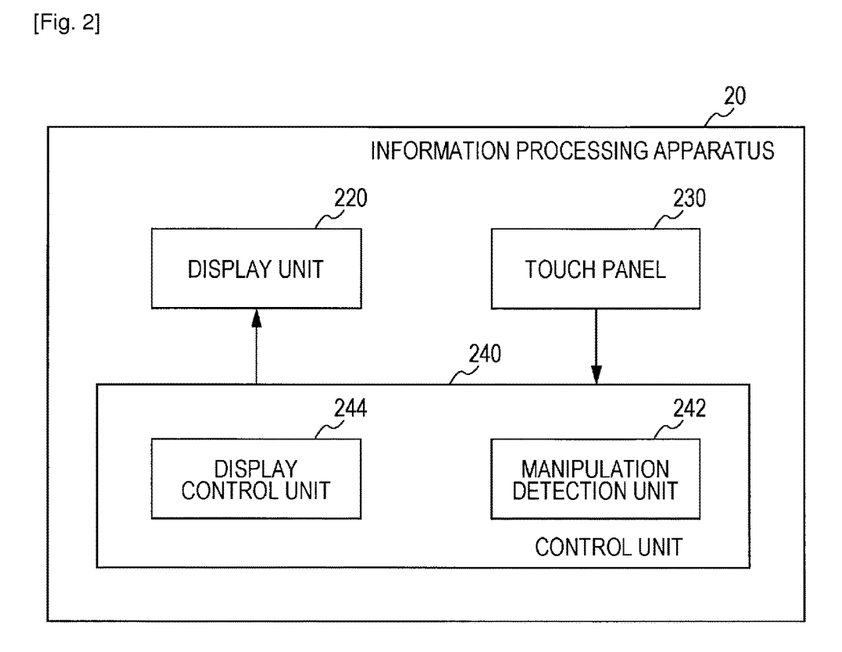
FIG. 2 is a functional block diagram showing a configuration of an information processing apparatus according to a first embodiment.

FIG. 2 is a functional block diagram showing the configuration of the information processing apparatus 20 according to the first embodiment. As shown in FIG. 2, the information processing apparatus 20 according to the first embodiment includes the display unit 220, the touch panel 230, and a control unit 240.

(Display Unit)

The display unit 220 displays various display screens in accordance with a control by the control unit 240. In particular, the display unit 220 according to this embodiment displays the lock release screen as shown in FIG. 1 when the information processing apparatus 20 is in the lock state.

Note that the display unit 220 is an example of an output device, and may be a display device such as a liquid crystal display (LCD) device or an organic EL (OLED: Organic Light Emitting Diode) display device.

(Touch Panel)

The touch panel 230 is an example of a manipulation detection unit (input device) that detects a position of a manipulation body on the touch panel 230. Herein, the touch panel 230 is provided so as to be laminated on the display unit 220 that displays the display screen, thereby enabling detection of the position of the manipulation body on the display screen. Note that the touch panel 230 used in this case may be a contact type sensor that detects the position of the manipulation body that contacts the surface of the casing on the detection surface side of the touch panel 230. Alternatively, the touch panel 230 may be a non-contact type sensor that detects the position of the manipulation body that approaches the touch panel 230. Note that the manipulation body that performs an input manipulation on the touch panel 230 may be a finger of a user or a stylus pen, for example.

(Control Unit)

The control unit 240 is a functional block implemented by an arithmetic unit, such as a CPU (Central Processing Unit), and a control program stored in a storage medium such as a ROM (Read Only Memory) or a RAM (Random Access Memory), and controls the overall operation of the information processing apparatus 20. Note that in the description, the device including the control unit 240 is described as an information processing apparatus, but a stand-alone control unit 240 may be regarded as an information processing apparatus.

The function of the control unit 240 according to this embodiment is particularly subdivided into the manipulation detection unit 242 that detects a user manipulation on the touch panel 230 based on an input from the touch panel 230, and the display control unit 244 that controls display of the display unit 220.

For example, in the state where the lock release screen is displayed on the display unit 220, when the manipulation of moving the manipulation object 40 by the user is detected by the manipulation detection unit 242, the display control unit 244 moves the manipulation object 40 and changes the appearance of how the target object 50 is displayed. For example, the appearance of the target object may be displayed as a change in size, shape, color, image, and/or icon. This configuration will be described in more detail below with reference to FIGS. 3 and 4.

Figure 3:
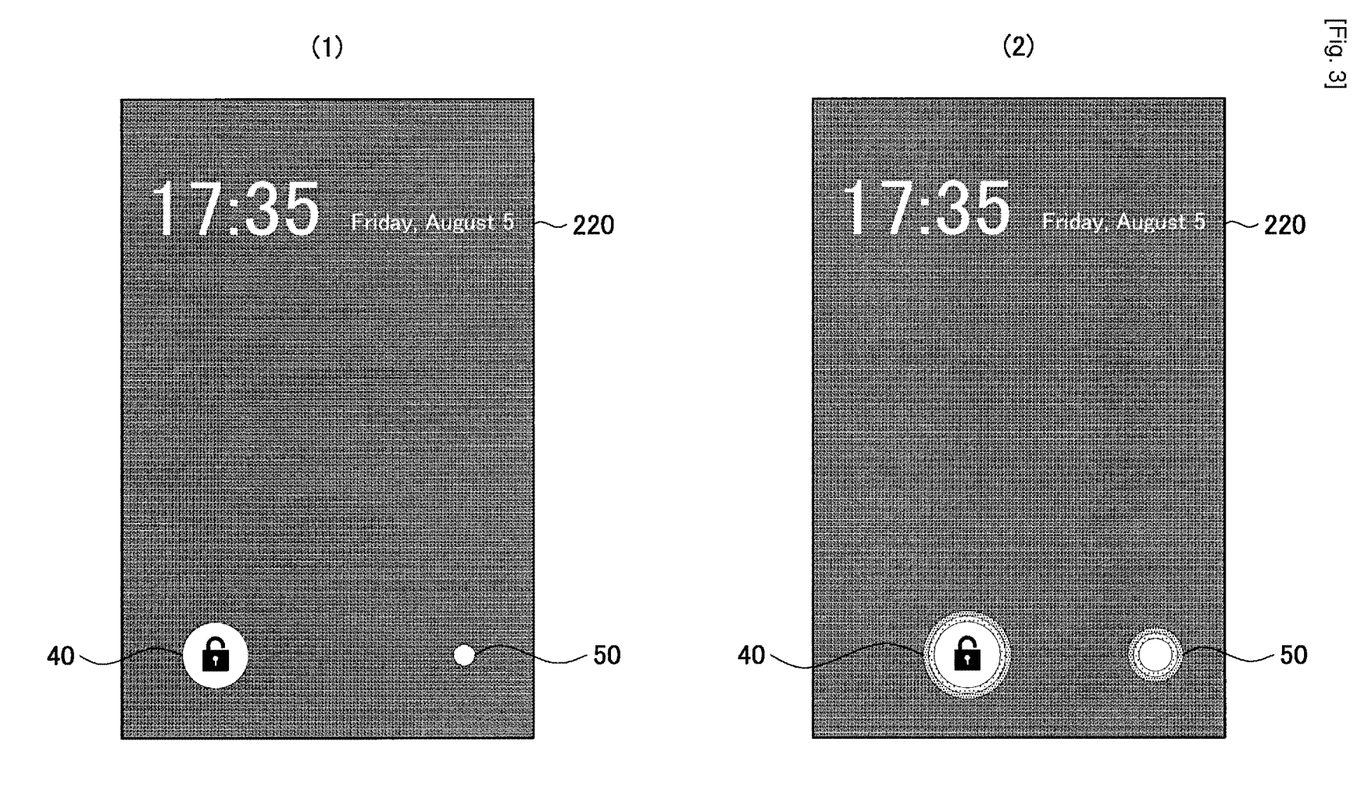
FIG. 3 is an explanatory diagram showing a display transition of a lock release screen.
Figure 4:
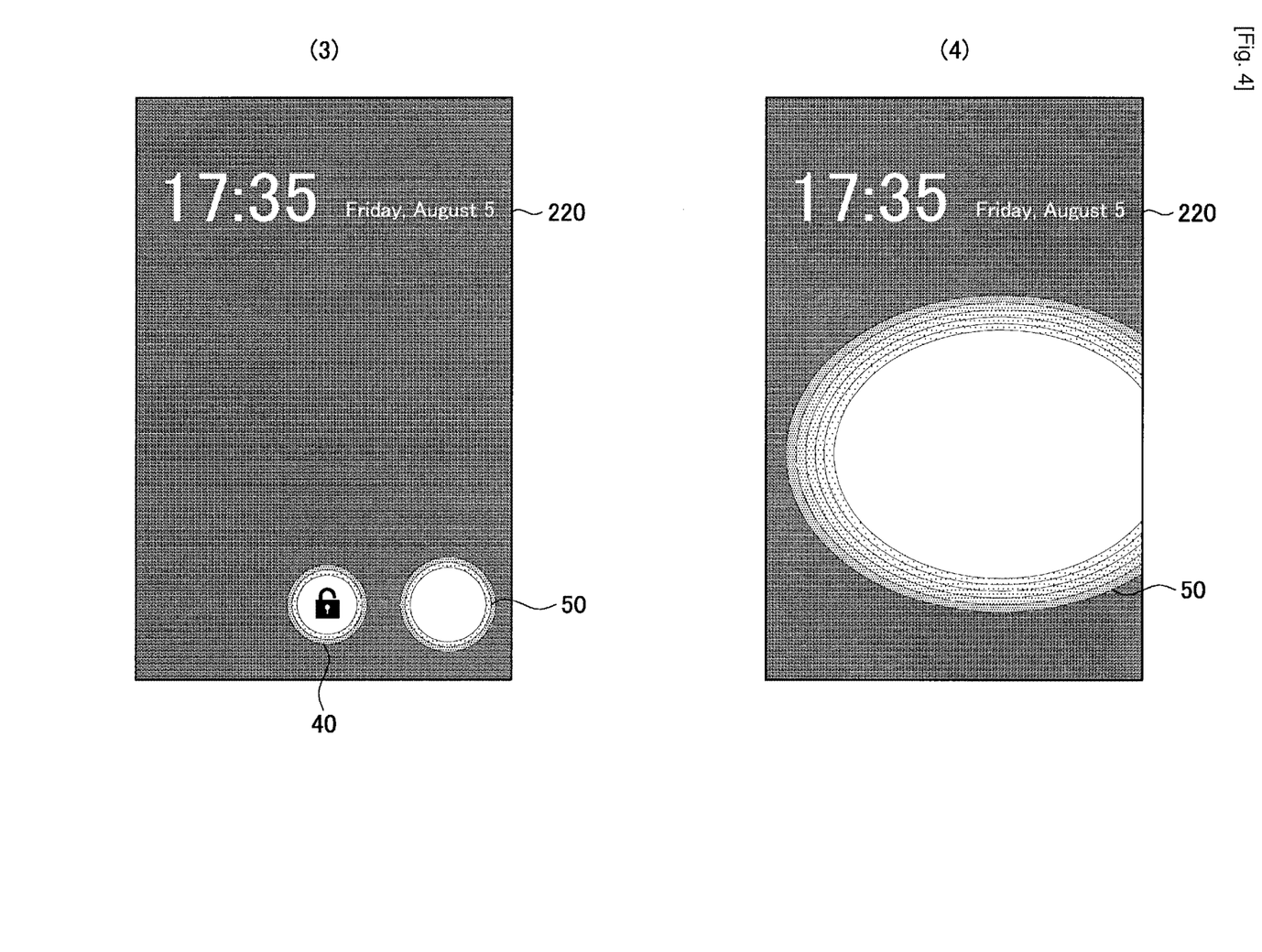
FIG. 4 is an explanatory diagram showing a display transition of the lock release screen.

FIGS. 3 and 4 are explanatory diagrams each showing a display transition of the lock release screen. In the initial state of the lock release screen shown in FIG. 3(1), when the user selects the manipulation object 40 and moves the manipulation object 40 toward the target object 50, the display control unit 244 increases the size of the target object 50 as shown in FIG. 3(2). Note that the display control unit 244 intermittently displays a path connecting the manipulation object 40 and the target object 50 in the initial state of the lock release screen, and does not necessarily display the path after the manipulation object 40 is selected.

After that, when the manipulation object 40 is placed closer to the target object 50, the display control unit 244 further increases the size of the target object 50 as shown in FIG. 4(3). Note that the display control unit 244 may change the size of the target object 50 in reverse proportion to a distance between the manipulation object 40 and the target object 50. Alternatively, the display control unit 244 may change the size of the target object 50 in proportion to a difference between the distance between the manipulation object 40 and the target object 50 in the initial state and the current distance.

When the manipulation object 40 reaches the target object 50, the display control unit 244 increases the size of the target object 50 so as to occupy a wide area of the display unit 220 as shown in FIG. 4(4). At the same time, the control unit 240 releases the lock state of the information processing apparatus 20.

(Supplementary Note)

Note that in FIGS. 3 and 4, the example in which the manipulation object 40 linearly moves toward the target object 50 has been described. However, the display control unit 244 is able to move the manipulation object 40 in any direction according to a user manipulation. That is, the movement path of the manipulation object 40 for the lock release need not be a straight line connecting the manipulation object 40 and the target object 50. A more detailed description will be given below with reference to FIGS. 5 and 6.

Figure 5:
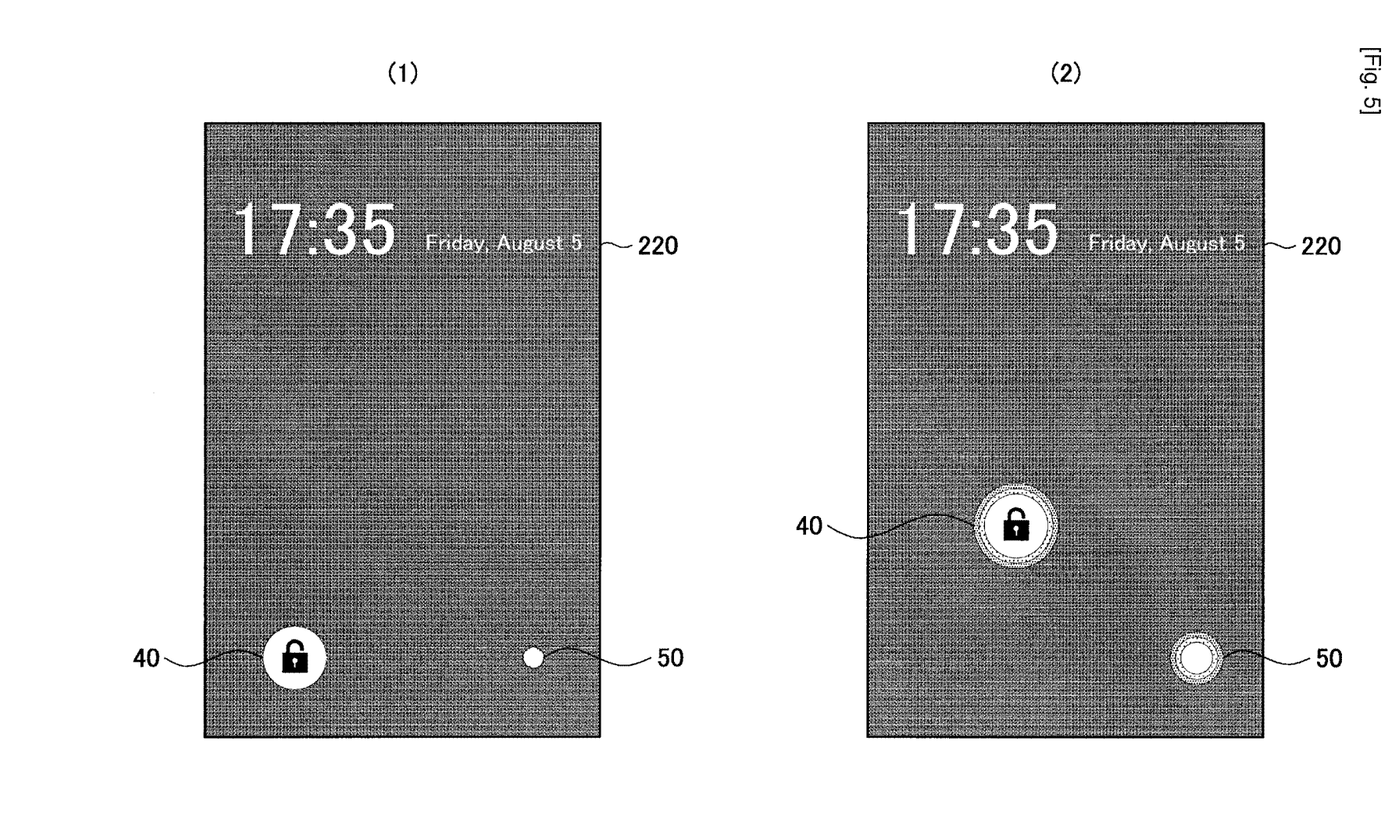
FIG. 5 is an explanatory diagram showing another example of a display transition of the lock release screen.
Figure 6:
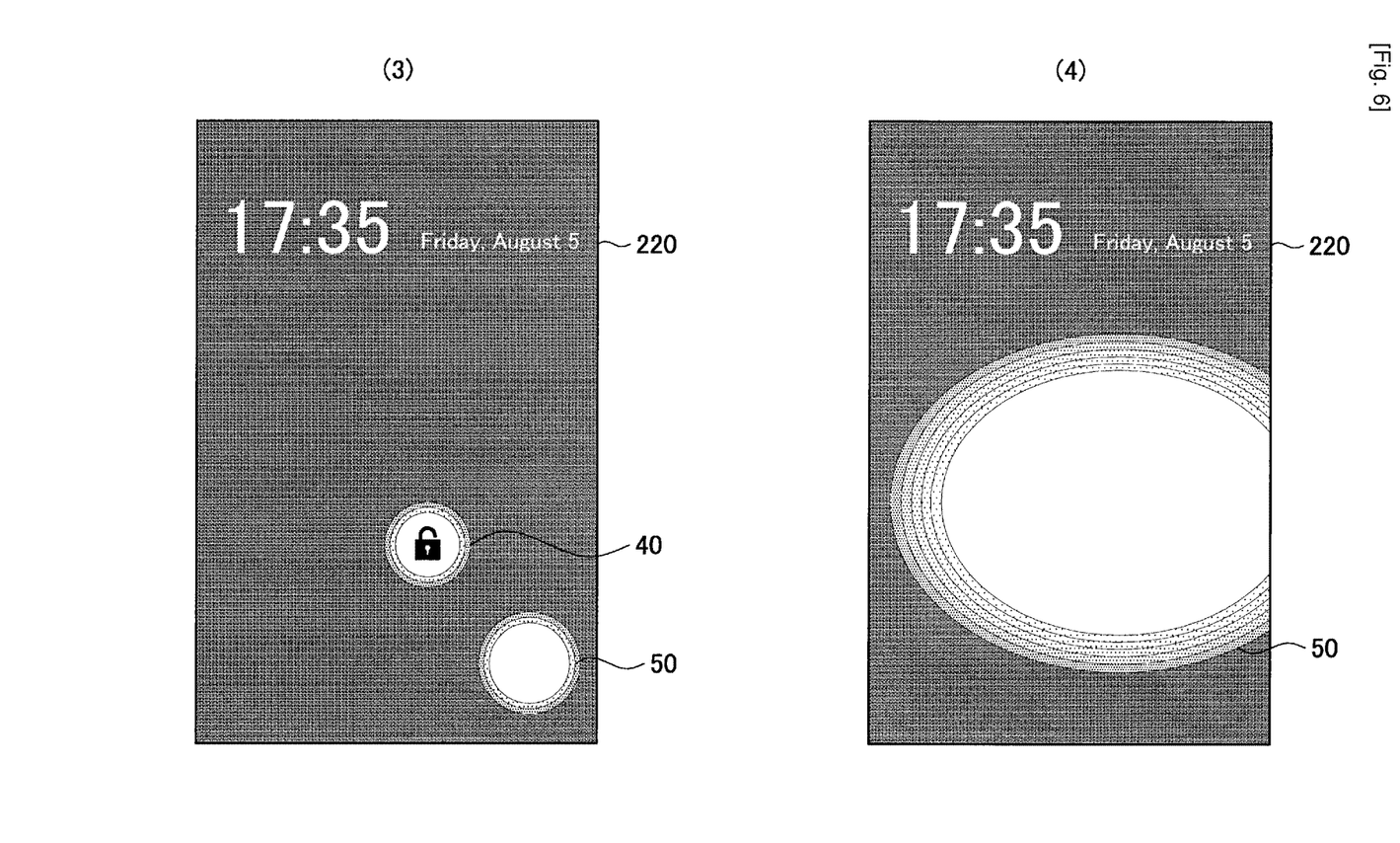
FIG. 6 is an explanatory diagram showing another example of a display transition of the lock release screen.

FIGS. 5 and 6 are explanatory diagrams each showing another example of a display transition of the lock release screen. In the initial state of the lock release screen shown in FIG. 5(1), when the user selects the manipulation object 40, the display control unit 244 moves the manipulation object 40 in any direction according to the user manipulation as shown in FIG. 3(2), and increases the size of the target object 50. Moreover, the manipulation detection device detects the moving of the manipulation object toward the target object as a function of absolute distance that need not be a direct linearly path. One non-limiting example of a non-linear path is an arch-shaped path.

After that, when the manipulation object 40 is placed more closer to the target object 50 so as to draw an arc, the display control unit 244 further increases the size of the target object 50 as shown in FIG. 6(3). Then, when the manipulation object 40 reaches the target object 50, the display control unit 244 increases the target object 50 so as to occupy a wide area of the display unit 220 as shown in FIG. 6(4). At the same time, the control unit 240 releases the lock state of the information processing apparatus 20.

(Conclusion on Configuration of Information Processing Apparatus)

As described above, the information processing apparatus 20 according to this embodiment can change display of the target object 50 according to the movement of the manipulation object 40, thereby allowing the user to easily recognize the progress of the lock release manipulation and the lock release timing based on the change in display of the target object 50.

More specifically, since the manipulation object 40 moves according to a user manipulation, the progress of the lock release manipulation and the like can be recognized also based on the movement of the manipulation object 40. However, when the user moves the manipulation object 40 by using a finger, the manipulation object 40 is hidden by the finger of the user. In one example, the manipulation object need not be displayed at all. Also from this point of view, changing the display of the target object 50 as in this embodiment is effective.

2-2. Operation of Information Processing Apparatus

Figure 7:
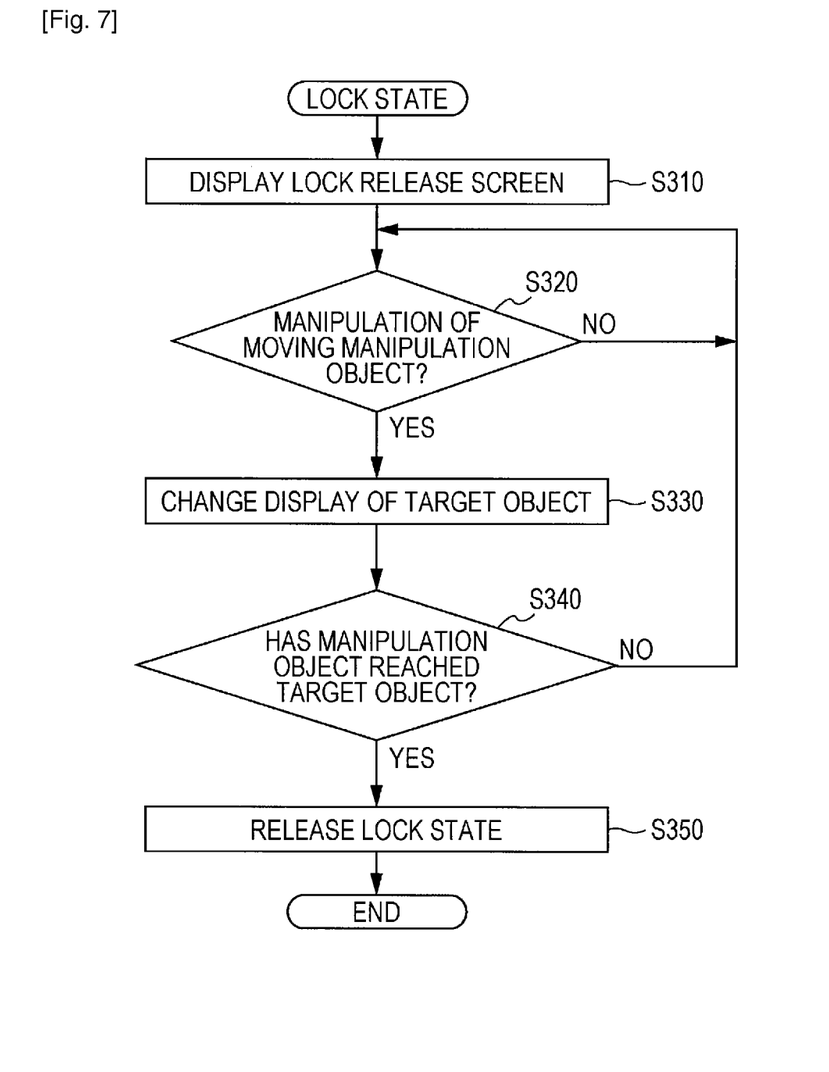
FIG. 7 is a flowchart in which operations of the information processing apparatus according to this embodiment are put in order.

The configuration of the information processing apparatus 20 according to this embodiment has been described above. Referring then to FIG. 7, the operations of the information processing apparatus 20 according to this embodiment are put in order.

FIG. 7 is a flowchart in which the operations of the information processing apparatus 20 according to this embodiment are put in order. As shown in FIG. 7, the display control unit 244 displays the lock release screen including manipulation object 40 and the target object 50 when the information processing apparatus 20 is in the lock state (S310).

After that, when the manipulation of moving the manipulation object 40 by the manipulation detection unit 242 is detected (S320), the display control unit 244 moves the manipulation object 40 and changes the display of the target object 50 (S330). For example, the display control unit 244 changes the size of the target object 50 according to the distance between the manipulation object 40 and the target object 50.

Then, when the manipulation object 40 reaches the target object 50 (S340), the display control unit 244 increases the size of the target object 50 so as to occupy a wide area of the display unit 220, and the control unit 240 releases the lock state of the information processing apparatus 20 (S350).

2-3. Modified Example

Note that the example in which the size of the target object 50 is changed according to the distance between the manipulation object 40 and the target object 50 has been described above. However, this embodiment is not limited to such an example. For example, the display control unit 244 may change the shape, color, or the like of the target object 50 according to the distance between the manipulation object 40 and the target object 50. Alternatively, the display control unit 244 may display an animation (for example, an animation associated with lock releasing, such as unlocking) of the target object 50 according to the distance between the manipulation object 40 and the target object 50. Furthermore, the appearance of the target object may be changed from silent to an audible sound that provides audible feedback that the manipulation object is approaching the target object. The change in sound may be a frequency modulation, such as, for example, the pitch of the sound increases as the manipulation object approaches the target object. Likewise, the appearance of the manipulation object may change from tactilely passive to tactilely active, such as by providing a haptic response, such as a vibration with increasing intensity as the manipulation object approaches the target object.

The manipulation of moving the manipulation object 40 has been described above as an example of the lock release manipulation, but this embodiment is not limited to such an example. For example, the lock release manipulation may be a manipulation of pressing the manipulation object 40. In this case, the display control unit 244 may place the manipulation object 40 within the area of the target object 50 and enlarge the manipulation object 40 according to the pressing of the manipulation object 40, and the control unit 240 may release the lock state when the manipulation object 40 is enlarged to reach the target object 50.

On the contrary, the display control unit 244 may reduce the target object 50 according to the pressing of the manipulation object 40, and the control unit 240 may release the lock state when the target object 50 is reduced to reach the manipulation object 40.

Although the example in which the manipulation object 40 and the target object 50 are constantly displayed on the lock release screen has been described above, this embodiment is not limited to such an example. For example, the manipulation object 40 may not be constantly displayed, and the display of the target object 50 may be started in the middle of the lock release manipulation.

Although the example in which the target position of the lock release manipulation on which the target object 50 is displayed is one point has been described, this embodiment is not limited to such an example. For example, the target position of the lock release manipulation may be a partial area of the display screen, such as an area along one side of the display unit 220. In this case, the target object 50 may be placed on the entire area or a partial area of the display screen corresponding to the target position.

Although the example in which the target object 50 functions as the object representing the target position of the lock release manipulation and as the object whose display is changed according to the movement of the manipulation object 40 has been described above, this embodiment is not limited to such an example. For example, the display control unit 244 may have a configuration in which the object representing the target position of the lock release manipulation and the object whose display is changed according to the movement of the manipulation object 40 are separately arranged.

3. Hardware Configuration

The display control operation by the information processing apparatus 20 described above is implemented by cooperating the hardware configuration included in the information processing apparatus 20 with software. In this regard, the hardware configuration of the information processing apparatus 20 will be described below.

Figure 8:
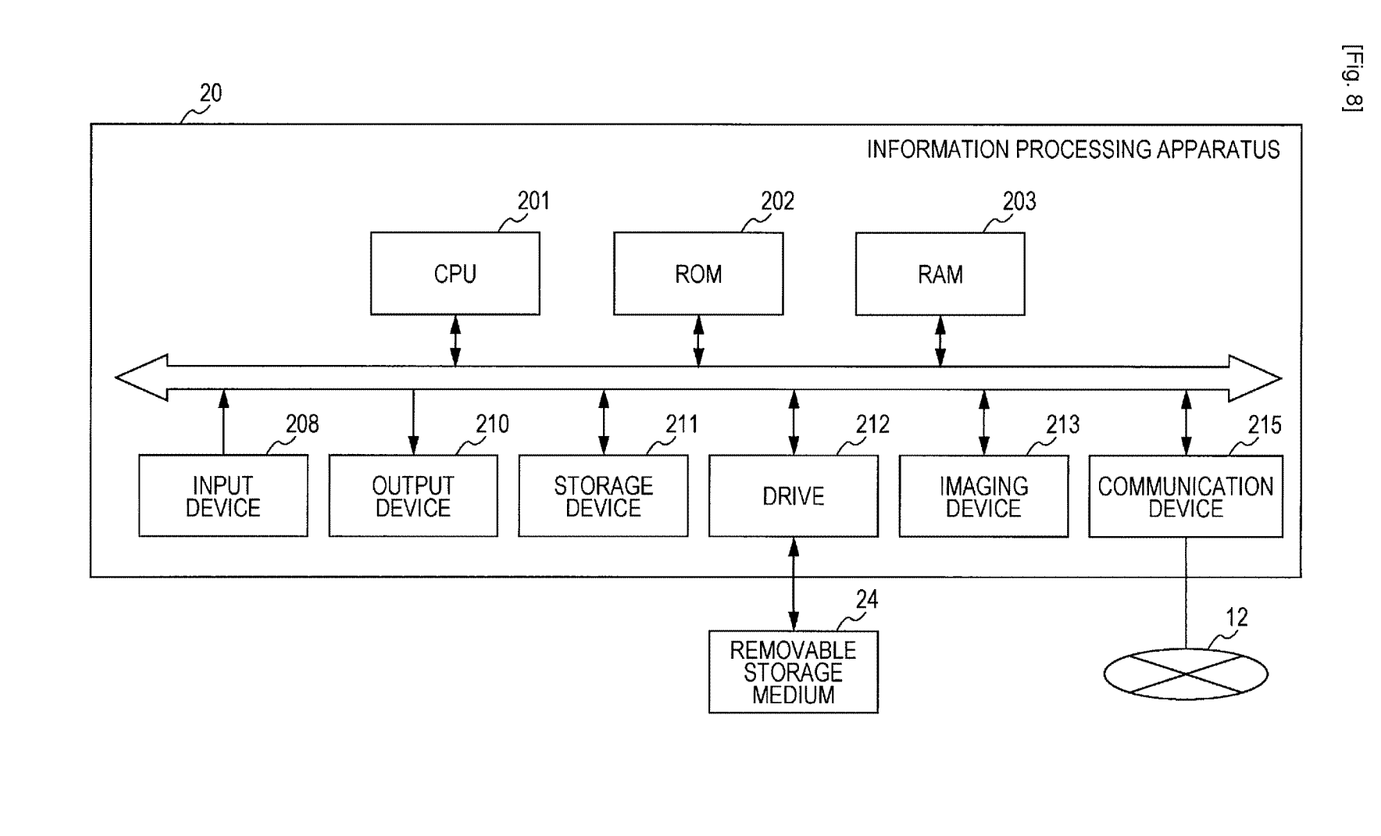
FIG. 8 is an explanatory diagram showing a hardware configuration of the information processing apparatus.

FIG. 8 is an explanatory diagram showing the hardware configuration of the information processing apparatus 20. As shown in FIG. 8, the information processing apparatus 20 includes a CPU (Central Processing Unit) 201, a ROM (Read Only Memory) 202, a RAM (Random Access Memory) 203, an input device 208, an output device 210, a storage device 211, a drive 212, an imaging device 213, and a communication device 215.

The CPU 201 functions as an arithmetic processing unit and a control device, and controls the overall operation within the information processing apparatus 20 according to various programs. The CPU 201 may be a microprocessor. The ROM 202 stores programs, operation parameters, and the like used by the CPU 201. The RAM 203 temporarily stores programs used to execute the CPU 201, and parameters that are appropriately changed during the execution, for example. These are interconnected via a host bus formed of a CPU bus or the like.

The input device 208 includes input means for a user to input information, such as a mouse, a keyboard, a touch panel, a button, a microphone, a switch, or a lever, and an input control circuit that generates an input signal based on an input by the user and outputs the input signal to the CPU 201, for example. The user of the information processing apparatus 20 manipulates the input device 208, thereby enabling input of various data into the information processing apparatus 20 or instruct the information processing apparatus 20 to perform a processing operation.

The output device 210 includes a display device such as a liquid crystal display (LCD) device, an OLED (Organic Light Emitting Diode) device, and a lamp, for example. The output device 210 also includes an audio output device such as a speaker and a headphone. For example, the display device displays a captured image and a generated image, for example. On the other hand, the audio output device converts audio data or the like into sound to be output. The output device 210 can produce an audio signal that is frequency modulated as the manipulation object is moved closer to the target object. Also, the output device provides a tactile transducer that produces a haptic response (such as vibration), the intensity of which is a function of the distance of the manipulation object to the target object.

The storage device 211 is a device for storing data which is configured as an example of a storage unit of the information processing apparatus 20 according to this embodiment. The storage device 211 may include a storage medium, a recording device for recording data in the storage medium, a reading device for reading data from the storage medium, a deletion device for deleting the data recorded in the storage medium, and the like. This storage device 211 stores programs and various data executed by the CPU 201.

The drive 212 is a reader/writer for storage medium which is incorporated in or externally mounted on the information processing apparatus 20. The drive 212 reads information recorded in a removable storage medium 24, such as a mounted magnetic disk, optical disk, magneto-optical disk, semiconductor memory, or the like, and outputs the information to the RAM 203. The drive 212 can also write information into the removable storage medium 24.

The imaging device 213 includes a signal conversion element such as an imaging optical system, such as a photographing lens or a zoom lens for collecting light, and a CCD (Charge Coupled Device) or a CMOS (Complementary Metal Oxide Semiconductor). The imaging optical system forms an image of an object on the signal conversion unit by collecting light emitted from the object, and the signal conversion element converts the formed object image into an electrical image signal.

The communication device 215 is a communication interface formed of a communication device or the like to be connected to a network 12, for example. The communication device 215 may be a communication device compliant with a wireless LAN (Local Area Network), a communication device compliant with LTE (Long Term Evolution), or a wire communication device that performs communication using a wire.

Note that the network 12 is a wired or wireless transmission line for information transmitted from a device connected to the network 12. For example, the network 12 may include a public network, such as the Internet, a telephone network, and a satellite communication network, various LANs (Local Area Networks) including Ethernet (registered trademark), and WAN (Wide Area Network). The network 12 may also include a leased line network such as IP-VPN (Internet Protocol-Virtual Private Network).

4. Conclusion

As described above, the information processing apparatus 20 according to this embodiment can change the display of the target object 50 according to the movement of the manipulation object 40. This allows a user to easily recognize the progress of the lock release manipulation and the lock release timing based on the change in display of the target object 50. Consequently, the operability of the lock release manipulation can be improved.

Preferred embodiments of the present disclosure have been described in detail above with reference to the accompanying drawings. However, the technical scope of the present disclosure is not limited to these embodiments. It is apparent that those ordinarily skilled in the technical field of the present disclosure can think of various modifications or corrections within the scope of the technical ideas set forth in the claims, and it should be understood that they also belong to the technical scope of the present disclosure.

For example, the steps in the processing of the power exchange system or the information processing apparatus 20 herein described does not necessarily have to be processed in time series according to the order described in each flowchart. For example, the steps in the processing of the information processing apparatus 20 may be processed in the order different from that described in the flowchart, and may be processed in parallel.

It is possible to produce a computer program for allowing the hardware, such as the CPU 201, the ROM 202, and the RAM 203, which are incorporated in the information processing apparatus 20, to exert the equivalent function of each component of the information processing apparatus 20 described above. A storage medium storing the computer program can also be provided. Furthermore, in a smartphone or tablet embodiment, the manipulation detection unit operates in a partial unlock state and a fully unlock state. The partial unlock state is invoked when the manipulation object is partially moved toward the target object, but not all the way. The fully unlocked state is invoked when the manipulation object is moved all the way such that it partially overlaps the target object. In the partial unlock state, the display shows the source of recently received text messages, voicemail messages, or e-mail messages. This way, the device keeps the sources of the messages secret until the user is ready to see who sent the message. If the user wants to read or listen to the message, the user will continue to move the manipulation object all the way to the target object so as to unlock the device. According to this embodiment, the user has control over maintaining a controlled amount of secrecy regarding the source of recent messages, and the content of the messages.

The following configurations also belong to the technical scope of the present disclosure.

An information processing apparatus embodiment that includes:

a display control device that controls a display of a lock release screen that has displayed thereon a manipulation object and a target object; and a manipulation detection device that detects a lock release manipulation as a detected moving of the manipulation object toward the target object, wherein the display control device changes an appearance of the target object in response to the manipulation detection device detecting the moving of the manipulation object toward the target object.

According to one aspect of the embodiment, the display control device changes the appearance of the manipulation object as a function of distance of the manipulation object to the target object.

According to another aspect of the embodiment, the display control device changes the information processing apparatus to an unlock state when the manipulation detection device detects that the manipulation object reaches the target object.

According to another aspect of the embodiment, the display control device changes a size of the target object in response to the manipulation detection device detecting the moving of the manipulation object toward the target object.

According to another aspect of the embodiment, the manipulation detection device detects the moving of the manipulation object toward the target object as a function of absolute distance.

According to another aspect of the embodiment, the display control device changes the appearance of the target object by changing a color of the target object or displaying an animation of the target object.

According to another aspect of the embodiment, the target object is an area of the lock release screen.

According to another aspect of the embodiment, the display control device changes a sound associated with the manipulation detection device detecting the moving of the manipulation object toward the target object.

According to another aspect of the embodiment, the display control device changes a tactile response associated with the manipulation detection device detecting the moving of the manipulation object toward the target object.

According to another aspect of the embodiment, the manipulation object is hidden from view when the manipulation object is moved toward the target object.

According to another aspect of the embodiment, the manipulation detect device detects that the lock release manipulation has started but not yet completed, and the display control device displays at least one of a source of a text message, a voicemail message and a e-mail in response to the manipulation device detecting that the lock release manipulation detected that the lock release manipulation has started but not yet completed.

According to another aspect of the embodiment, the display control device presents a content of a text message, a voicemail message or an e-mail in response to the manipulation device detecting that the lock release manipulation detected that the lock release manipulation has detected an unlock state.

According to a display control method embodiment, the method includes controlling display of a lock release screen having a manipulation object and a target object displayed thereon;

detecting a lock release manipulation as a detected movement of the manipulation object toward the target object on the lock release screen; and changing an appearance of the target object in response to the detecting of the lock release manipulation of the manipulation object.

According to one aspect of the embodiment, the changing includes changing the appearance of the manipulation object as a function of distance of the manipulation object to the target object.

According to another aspect of the embodiment, the changing includes changing to an unlock state on an information processing apparatus when the detecting detects that the manipulation object reaches the target object.

According to another aspect of the embodiment, the changing includes changing a size of the target object in response to detected movement of the manipulation object toward the target object.

According to another aspect of the embodiment, the detecting includes detecting the detected movement of the manipulation object toward the target object as a function of absolute distance.

According to another aspect of the embodiment, the changing includes changing the appearance of the target object by changing a color of the target object or displaying an animation of the target object.

According to another aspect of the embodiment, the target object is an area of the lock release screen.

According to a non-transitory computer program product embodiment, the product has stored thereon computer readable instructions that when executed by a processor perform a display control method, the method includes controlling display of a lock release screen having a manipulation object and a target object displayed thereon;

detecting a lock release manipulation as a detected movement of the manipulation object toward the target object on the lock release screen; and changing an appearance of the target object in response to the detecting of the lock release manipulation of the manipulation object.

REFERENCE SIGNS LIST

20 Information processing apparatus
220 Display unit
230 Touch panel
240 Control unit
242 Manipulation detection unit
244 Display control unit

The invention claimed is:

1. An information processing apparatus comprising:
   circuitry configured to
      control a display of a lock release screen that includes a manipulation object and a target object; and
      detect a lock release manipulation as a detected pressing manipulation of the manipulation object;
      change a display size of the manipulation object or the target object in response to the detecting of the pressing manipulation of the manipulation object on an unchanging position of a display displaying the lock release screen such that the display size of the manipulation object or the target object is changed without movement of the manipulation object and the target object as a pressure level of the pressing manipulation of the manipulation object is increased; and
      change a state of the information processing apparatus to an unlock state when, without movement of the manipulation object and the target object, the display size of the manipulation object is changed to reach the target object or when the display size of the target object is changed to reach the manipulation object.

2. The information processing apparatus of claim 1, wherein the circuitry is further configured to
   detect the lock release manipulation as a detected moving of the manipulation object toward the target object; and
   change the display size of the manipulation object or the target object as a function of distance between the manipulation object and the target object.

3. The information processing apparatus of claim 2, wherein
   the circuitry is further configured to change a state of the information processing apparatus to an unlock state when the circuitry detects that the manipulation object reaches the target object.

4. The information processing apparatus of claim 2, wherein
   the circuitry is further configured to change a size of the target object in response to the information processing apparatus detecting a movement of the manipulation object toward the target object.

5. The information processing apparatus of claim 4, wherein
   the circuitry is further configured to detect the moving of the manipulation object toward the target object as a function of absolute distance.

6. The information processing apparatus of claim 1, wherein
   the circuitry is further configured to change the appearance of the target object by changing a color of the target object or displaying an animation of the target object.

7. The information processing apparatus of claim 1, wherein the target object is an area of the lock release screen.

8. The information processing apparatus of claim 2, wherein
   the circuitry is further configured to change a sound associated with detecting the moving of the manipulation object toward the target object.

9. The information processing apparatus of claim 2, wherein
   the manipulation object is hidden from view when the manipulation object is moved toward the target object.

10. The information processing apparatus of claim 1, wherein circuitry is further configured to:
    detect that the lock release manipulation has started but not yet completed; and
    display a source of an incoming message without displaying a content of the incoming message in response to the information processing apparatus detecting that the lock release manipulation has started but not yet completed.

11. The information processing apparatus of claim 10, wherein
    the circuitry is further configured to present the content of the incoming message in response to the information processing apparatus reaching a lock release state.

12. The information processing apparatus of claim 1, wherein the circuitry is further configured to:
    enlarge the manipulation object according to a level of pressure on the manipulation object; and
    change the state of the information processing apparatus to an unlock state when the manipulation object is enlarged to reach the target object.

13. A display control method comprising:
    controlling, by an information processing apparatus, display of a lock release screen including a manipulation object and a target object displayed thereon;
    detecting, by the information processing apparatus, a lock release manipulation as a detected pressing manipulation of the manipulation object on the lock release screen;

changing, by the information processing apparatus, a display size of the manipulation object or the target object in response to the detecting of the pressing manipulation of the manipulation object on an unchanging position of a display displaying the lock release screen such that the display size of the manipulation object or the target object is changed without movement of the manipulation object and the target object as a pressure level of the pressing manipulation of the manipulation object is increased; and changing, by the information processing apparatus, a state of the information processing apparatus to an unlock state when, without movement of the manipulation object and the target object, the display size of the manipulation object is changed to reach the target object or when the display size of the target object is changed to reach the manipulation object.

14. The method of claim 13, further comprising:

detecting the lock release manipulation as a detected moving of the manipulation object toward the target object, wherein the changing includes changing the appearance of the manipulation object as a function of distance between the manipulation object and the target object.

15. The method of claim 14, wherein the changing includes changing to an unlock state on an information processing apparatus when the detecting detects that the manipulation object reaches the target object.

16. The method of claim 14, wherein the changing includes changing a size of the target object in response to detected movement of the manipulation object toward the target object.

17. The method of claim 16, wherein the detecting includes detecting the detected movement of the manipulation object toward the target object as a function of absolute distance.

18. The method of claim 13, wherein the changing includes changing the appearance of the target object by changing a color of the target object or displaying an animation of the target object.

19. A non-transitory computer program product having stored thereon computer readable instructions that when executed by a processor perform a display control method comprising:

controlling, by an information processing apparatus, display of a lock release screen including a manipulation object and a target object displayed thereon;

detecting, by the information processing apparatus, a lock release manipulation as a detected pressing manipulation of the manipulation object on the lock release screen;

changing, by the information processing apparatus, a display size of the manipulation object or the target object in response to the detecting of the pressing manipulation of the manipulation object on an unchanging position of a display displaying the lock release screen such that the display size of the manipulation object or the target object is changed without movement of the manipulation object and the target object as a pressure level of the pressing manipulation of the manipulation object is increased; and changing, by the information processing apparatus, a state of the information processing apparatus to an unlock state when, without movement of the manipulation object and the target object, the display size of the manipulation object is changed to reach the target object or when the display size of the target object is changed to reach the manipulation object.

* * * * *